United States Patent [19]

Polastri et al.

[11] 4,202,539
[45] May 13, 1980

[54] ENGINE WORK STAND

[75] Inventors: Robert S. Polastri, Branford; Harry L. Ruzicka, Jr., Easton, both of Conn.

[73] Assignee: Avco Corporation, Stratford, Conn.

[21] Appl. No.: 960,910

[22] Filed: Nov. 15, 1978

[51] Int. Cl.² ............................................. B23Q 1/04
[52] U.S. Cl. .................................... 269/70; 269/287; 269/296
[58] Field of Search ............... 269/287, 289 MR, 296, 269/71, 69–70, 55; 228/48

[56] References Cited

U.S. PATENT DOCUMENTS

| | | | |
|---|---|---|---|
| 1,521,146 | 12/1924 | Allen | 269/55 |
| 2,356,864 | 8/1944 | Martin et al. | 269/70 |
| 2,931,644 | 4/1960 | Kenworthy | 269/296 |
| 3,868,101 | 2/1975 | Nozaki et al. | 269/287 |

Primary Examiner—Robert C. Watson
Attorney, Agent, or Firm—Ralph D. Gelling

[57] ABSTRACT

A work stand for rotably mounting an engine thereon during the initial construction of the engine, or for repair of the engine, includes two concentric rings which are disposed in upstanding relationship and are mounted on a base. The inner ring is rotably mounted within the outer ring and includes a plurality of axially extending arms which engage the engine. The latter is mounted in a generally horizontal disposition and is rotable with the inner ring whereby access to the engine is unobstructed from either the top or bottom of the engine, as well as along the entire length of the engine. A locking mechanism is provided between the inner and outer rings of the work stand for maintaining the engine at the desired angular attitude, and the engine is mounted such that its center of gravity is disposed adjacent the upstanding planes of the concentric rings.

3 Claims, 6 Drawing Figures

ENGINE WORK STAND

The present invention relates to a new and improved work stand for rotably mounting an engine during the initial construction or repair of the engine, and more particularly, a work stand wherein the engine is mounted in a generally horizontal disposition by a plurality of support arms extending from one of two upstanding concentric rings, such that unobstructed access to the various portions of the engine is readily available.

There are several types of engine work stands which are presently available, and which have certain shortcomings, especially when such stands are used in connection with large gas turbine engines, as employed in large aircraft or helicopters. As an example, there are engine work stands which include horizontally disposed rotable rings which mount an engine such that its longitudinal axis extends generally vertical, whereby access to the upper end of the engine is readily afforded, whereas access to the opposite end of the engine which is mounted below the rings is extremely difficult. In another type of known engine stand, as exemplified by U.S. Pat. No. 3,675,914 which issued on July 11, 1972 and is entitled "Engine Stand", a vertical support member is mounted on a base, with a generally horizontally disposed shaft extending through the upper portion of the vertical support member and rotatable in relation thereto. An engine attachment means is connected to one end portion of the shaft, while a spoke wheel and hub assembly is attached to the opposite portion of the shaft means. Adjustable weight means are attached to the rim and/or spokes of the spoke wheel for balancing the distribution of forces required to turn the wheel assembly. As is readily apparent, since the engine is secured at one end thereof to the engine stand, and since the engine is effectively cantilevered at said one end of the shaft means, the size of the engine which may be mounted on the engine stand is limited. The cantilevered engine gives rise to a large stress and force moment imposed on the shaft means and engine stand, especially since the center of gravity of the engine is located at a distance from the vertical mounting of the rotable shaft on the support member of the engine stand.

Accordingly, it is an object of the subject invention to provide a new and improved work stand for rotably mounting an engine, and more particularly a work stand which may readily accommodate large gas turbine engines, as employed in aircraft and helicopters.

It is a further object of the invention to provide a work stand which affords complete accessibility to any point of the engine or the transmission portion of the engine, and enables the engine to be completely rotated through 360°.

It is still a further object of the invention to provide a work stand which is compatible with standard engine hard mounting points formed integral with the engine, whereby no attachments or adaptors are required for mounting the engine to the work stand.

It is another object of the invention to provide a work stand which occupies less space than known stands, and which is completely adaptable to any type of engine including gas turbine engines.

Still further, it is an object of the subject invention to provide a work stand wherein the center of gravity of the gas turbine engine is disposed in the vicinity of the main structural portions of the stand, thereby increasing the safety factor of the subject work stand.

In addition, the subject invention provides a stand which maintains the engine at a generally horizontal disposition, and at an elevated location for optimum accessibility by a mechanic during assembly or repair of the engine. In the subject invention, due to the design and optimum location of the bearings forming portions of the work stand, rotation of the engine under adverse conditions of loading does not affect the ease at which rotation of the engine may be effected.

The above objects and advantages are achieved by the subject work stand which basically consists of a base on which is mounted inner and outer rolled channels which are housed with bearings such that the inner channel can be rotated 360° or stopped at any prescribed interval relative to the outer fixed channel. The outer channel is anchored to a base plate which, in turn, is anchored to the ground. The inside diameter of the inner ring is preferably about five feet such that most presently known gas turbine engines may be accommodated within the subject work stand. When mounted in the build stand, the gas turbine engine is disposed in a generally horizontal disposition, with its center of gravity located in the vicinity of the upstanding inner and outer channels, directly above the base support.

Further objects and advantages of the invention will become apparent from a reading of the following detailed description taken in conjunction with the drawings in which.

Figure 1:
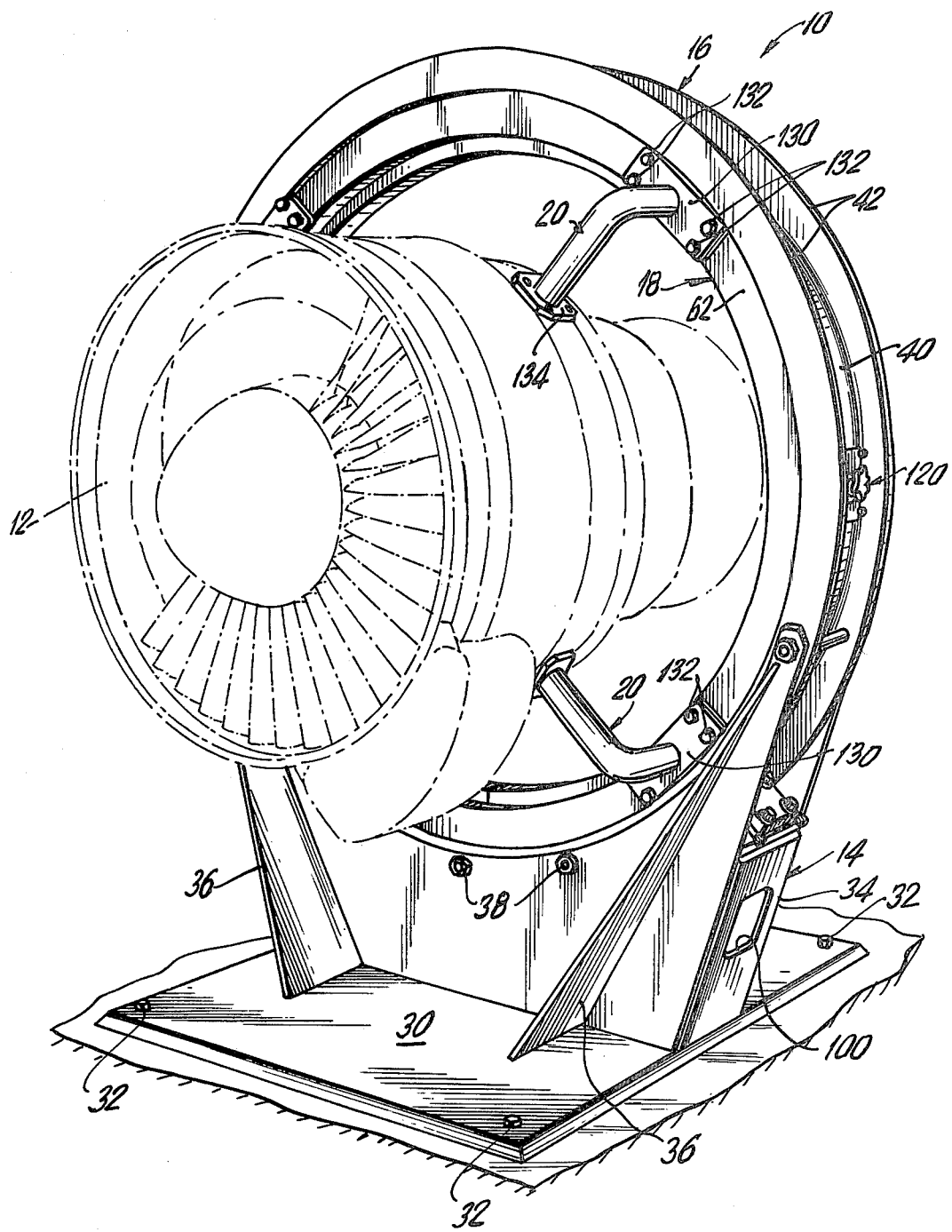
FIG. 1 is a perspective view of the work stand of the subject invention with a gas turbine engine mounted thereon.

Turning to FIG. 1, the work stand of the subject invention is generally designated by the numeral 10 and is adapted to rotably mount a gas turbine engine 12 in a generally horizontal disposition for 360° rotation about its longitudinal axis. The work stand 10 basically comprises a base 14 which fixedly supports an upstanding outer ring 16, and with an inner ring 18 being concentric with and rotably mounted within said outer ring 16. Fixedly attached to and extending from the inner ring 18 are a plurality of support arms 20 which are fixedly connected to the hard mounting plates of the gas turbine engine.

Figure 2:
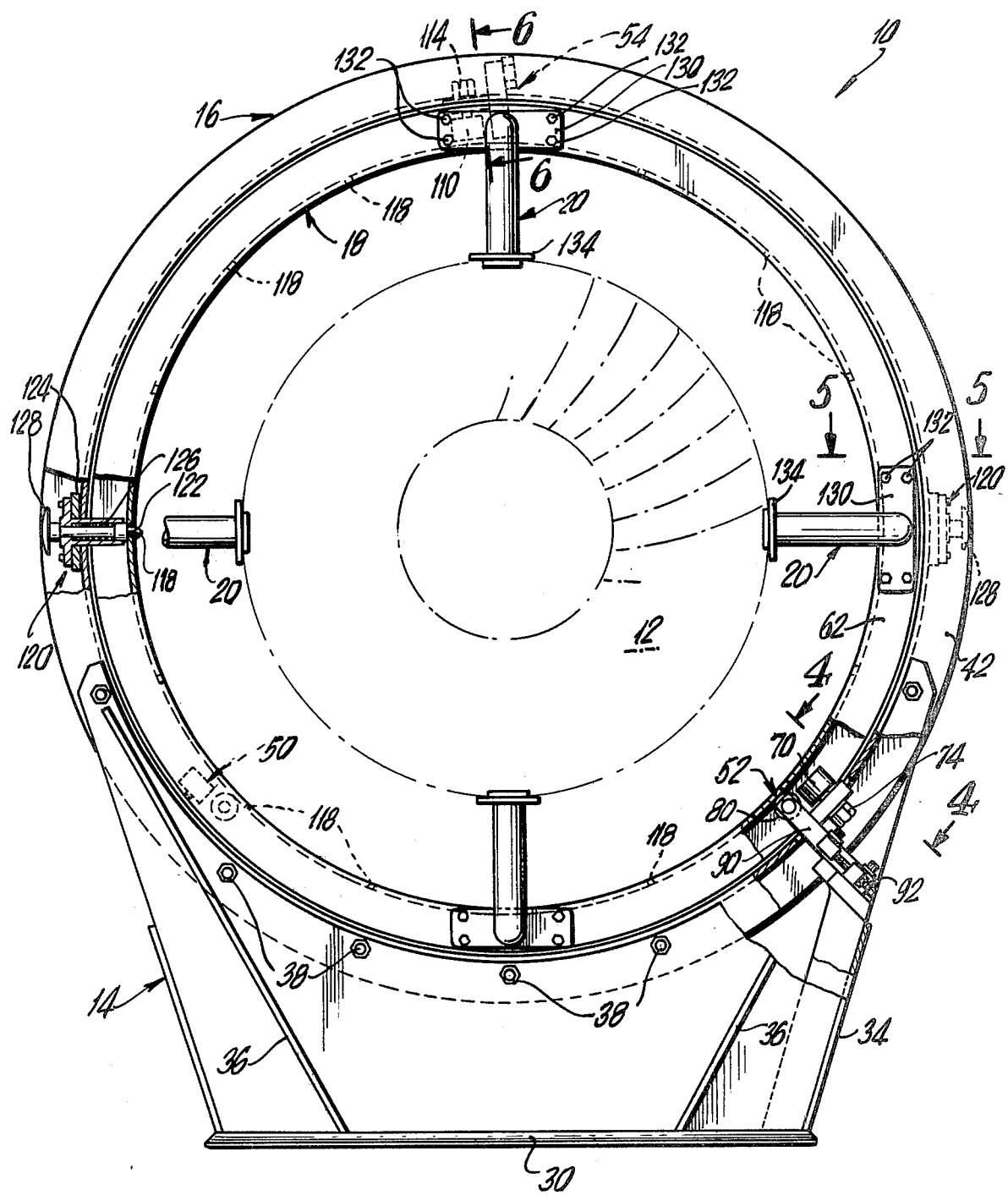
FIG. 2 is a front elevational view of the work stand of the subject invention.
Figure 3:
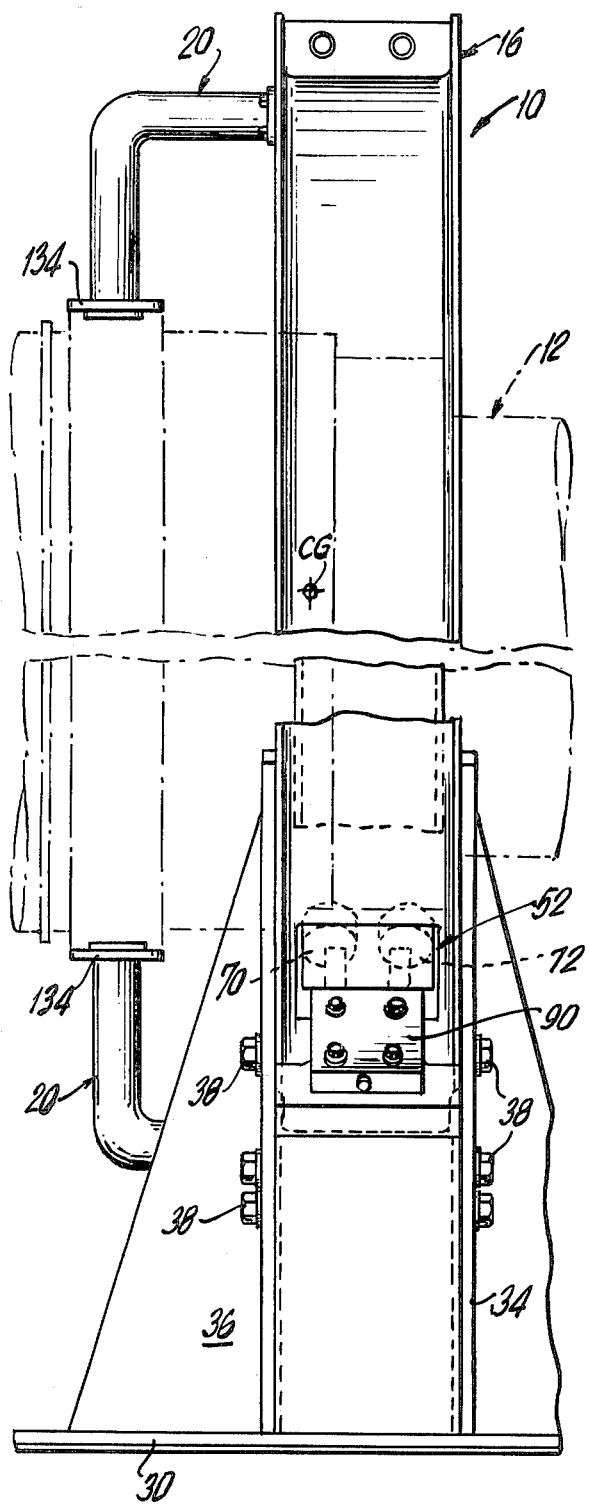
FIG. 3 is a side elevational view of the work stand with engine mounted thereon as shown in FIG. 1.
Figure 4:
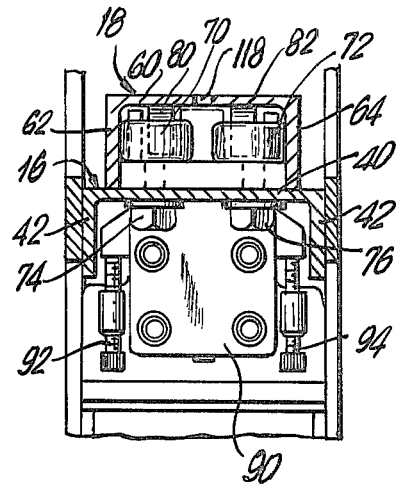
FIG. 4 is a sectional view taken along line 4—4 in FIG. 2.
Figure 5:
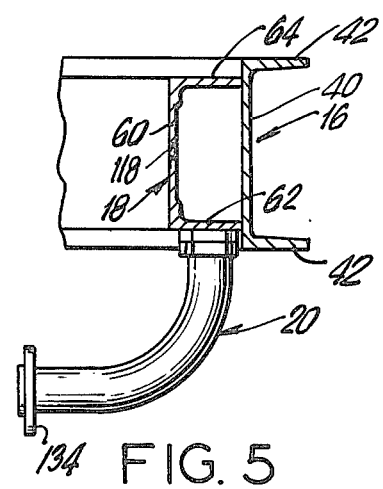
FIG. 5 is a sectional view taken along lines 5—5 in FIG. 2.
Figure 6:
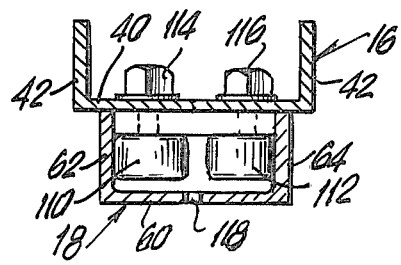
FIG. 6 is a sectional view taken along lines 6—6 in FIG. 2.

As shown in FIGS. 1 through 3, the base 14 includes a platform 30 which is secured to the ground by means of bolts 32, with the upstanding support portion 34 of the base 14 being reinforced against tilting by structural flange plates 36. Fixedly secured to the upstanding support portion 34 of the base 14 by bolts 38 is the outer ring 16 which is generally U-shaped in cross-section. More particularly, as shown in FIGS. 4 and 6, the outer ring 16 is formed of a rolled channel including a base 40 and two arm portions 42, 42. The base 40 is disposed radially inwardly of the arms 42, 42 with the latter being secured to the upstanding support portion 34 by bolts 38.

Fixedly secured to the base 40 of the outer ring 16 are three bearing assemblies designated by the numeral 50, 52, and 54. Bearing assemblies 50 and 52 are disposed below the center of the longitudinal axis of the outer ring 16, and each assembly includes both radial and longitudinal bearings for supporting and guiding the inner ring 18 relative to the outer ring 16. On the other hand, the upper bearing 54 does not require radial bearings, and thus may only include longitudinal bearings.

The inner ring 18 is also of U-shaped cross-section and, as shown in FIGS. 4 and 6 includes a base portion 60 and two arm portions 62 and 64. The base portion 60 is disposed radially inwardly of the arm portions 62, 64, and the inner ring is preferably formed of a roller channel member. The base portion 60 of the inner ring 18 is of smaller width than the base 40 of the outer ring 16. FIGS. 3 and 4 illustrate the lower bearing assemblies 50 and 52 for radially and longitudinally supporting the inner ring relative to the outer ring. Two rollers 70 and 72 are mounted on shafts which are fixedly secured to the base 40 of the outer ring 16 by bolts 74 and 76. The rollers 70 and 72 are positioned to respectively bear against the arms 62 and 64 of the inner ring 18 and thereby maintain the longitudinal position of the inner ring relative to the outer ring. Each bearing assembly 50 and 52 also includes two rollers 80 and 82 which are mounted on a bracket assembly 90 which is radially adjustable by adjustable screw mechanisms 92, 94 fixedly secured to the outer ring assembly 16. As shown in FIGS. 1 and 2, the upstanding support portion 34 of the base 14 includes openings 100 on opposite sides thereof to provide access to the adjusting screw mechanisms 92, 94. Rollers 80 and 82 bear against the inside surface of the base portion 60 of the inner ring 18 so as to support the inner ring in spaced relationship from the base portion 40 of the outer ring 16. Accordingly, each bearing assembly 50 and 52 includes rollers 70 and 72 for limiting longitudinal movement of the inner ring relative to the outer ring, as well as two adjustable rollers 80 and 82 for radially supporting the inner ring relative to the outer ring.

Referring to FIG. 6, the upper bearing assembly 54 includes two rollers 110 and 112 which are mounted on shafts secured to the base 40 of the outer ring 16 by bolts 114 and 116. Rollers 110 and 112 are operative to support the inner ring assembly 18, and more particularly the arm portions 62 and 64 thereof relative to the outer ring 16.

Thus, the combination of the composite bearing assemblies 50 and 52, as well as the upper bearing assembly 54 provides an arrangement for rotably supporting the inner ring 18 relative to the outer ring, with the lower bearing assemblies 50 and 52 radially supporting the inner ring, as well as limiting longitudinal movement thereof relative to the outer ring, while the upper bearing assembly 54 merely requires a pair of rollers 110 and 112 to limit longitudinal movement of the inner ring relative to the outer ring 16.

Referring to FIGS. 1 and 2, in order to fix the angular position of the inner ring relative to the outer rings, spring biased locking mechanisms, generally designated by the numerals 120, 120 are provided on diametrically opposite sides of the composite ring assembly. Each locking mechanism comprises a plunger 122 which is slidably supported in a housing 124 fixedly secured to the base 40 of the outer ring assembly. The plunger is spring biased by spring means 126 and is of sufficient length to extend through one of the array of holes 118 provided in the base portion 60 of the inner ring. The opposite end of each plunger 124 terminates in a handle 128 to facilitate manual retraction of the plunger 122 from an aperture 118 in order to enable the inner ring to be rotated relative to the outer ring. By having two diametrically opposed locking mechanisms, an additional safety feature is provided in the subject work stand in that it requires two operators to retract the plungers 122, 122 from the holes 118, 118 in the inner ring in order to disengage the inner ring relative to the outer ring for relative rotation.

Referring to FIGS. 1, 2, 3 and 5, each support arm 20 is generally L-shaped in configuration, with one end thereof terminating in a bracket 130 which is fixedly secured to the arm portion 62 of the inner ring by bolts 132. The opposite end of each support arm 20 terminates in a mounting plate 134 which is adapted to engage and be bolted to the hard mounting normally provided on the gas turbine engine 12. As is readily apparent, the length and sizes of the support arms 20 may be readily changed, as required depending on the size of the gas turbine engine 12 to be rotably mounted in the work stand 10.

In operation, the gas turbine engine 12 is fixedly secured to the support arms 20 such that the longitudinal axis of the gas turbine engine is disposed generally parallel with the platform 30 of the base 14 and with the center of gravity (C.G., see FIG. 3) of the gas turbine engine being disposed approximately along the planes of the inner and outer concentric rings 16 and 18. Accordingly, in such position, any tilting moment created by the mounting of the gas turbine engine is greatly minimized. In addition, by manual actuation of the opposed spring biased locking means, the entire engine, along with the inner ring 18 may be readily rotated through 360° relative to the outer, fixed ring 16. As clearly illustrated in FIGS. 1 and 3, access to the entire gas turbine engine 12 is readily available, both from beneath the engine, as well as from the top and the sides of the engine. It is noted that since the base 60 of the inner ring is of less width than the base 40 of the outer ring, there is less tendency for the operators to pinch their fingers in the space between the inner and outer rings, as the inner ring is being rotated.

In summary, there is provided a new and improved engine work stand which affords the mechanical maximum accessibility to the gas turbine engine during the initial construction of the engine, or during repair or tear down of the engine. The subject invention provides a work stand which consists of inner and outer rolled channel rings which are housed with bearings such that the inner ring may be rotated 360° relative to the outer ring, and may be stopped at any desired angular interval. The outer ring channel is anchored to the base plate which, in turn, is anchored to the ground, and preferably the inner diameter of the inner ring 18 is of sufficient size to accommodate even large gas turbine engines.

The subject work stand provides complete accessibility to any point of the engine or engine transmission, enables complete 360° rotation of the inner ring and the gas turbine engine, and due to the design and optimum location of the lower bearings 50 and 52, as well as the upper bearing 54, rotation of the inner ring relative to the outer ring is readily achieved even under adverse conditions of loading of the gas turbine engine while mounted in the stand.

While the preferred embodiment of the subject invention has been described and illustrated, it would be obvious that various changes and modifications can be made therein without departing from the spirit of the invention which should be limited only by the scope of the appended claims.

What is claimed is:

1. A build stand for rotatably mounting an engine thereon comprising:
   a base;
   an outer structural ring fixed to and supported by the base, in a substantially vertical plane, said ring being constructed of a rolled channel member, having a U-shaped cross section including base portion and arm portions;
   bearing means secured to the outer ring and disposed on the radially inward surface of said outer ring;
   an inner structural ring concentrically mounted within the outer ring for rotation on said bearings, said ring being constructed of a rolled channel member having a U-shaped cross section including a base portion and arm portions, said base portion positioned radially inward of said arm portion;
   a plurality of axially extending support arms fixed to said inner ring and having means to receive and secure the engine in a generally horizontal disposition such that its longitudinal axis is generally aligned with the longitudinal axis of the concentric rings, and the center of gravity of the engine is disposed substantially within the plane of said rings.

2. A build stand for rotatably mounting an engine thereon as described in claim 1 wherein:
   the bearing means comprises a pair of multiple bearing assemblies positioned on the inner face of the outer ring at a location below the axis of said ring, said assemblies having bearing surfaces which engage the arms and base of said inner ring to provide both radial and axial support and a single bearing assembly positioned on the inner face of the outer ring above the axis of the ring having dual bearing surfaces engaging the arms of said inner ring to provide axial support.

3. A build stand for rotatably mounting an engine thereon as described in claim 2 further comprising a safety lock mechanism for preventing rotation of the inner ring relative to the outer ring comprising:
   an array of holes constructed in the base portion of the inner ring;
   at least two holes constructed in the base portion of the outer ring adjacent the first array of holes and positioned on opposite sides of the vertical periphery of said outer ring;
   at least two housings mounted on the outer ring adjacent the outer ring holes; and
   a plunger mounted in each of the housings for manually activated sliding movement therein through the outer ring holes for locking engagement with one of the holes in the inner ring, said plunger being spring biased in the radially inward direction.

* * * * *